Patented Apr. 29, 1941

2,240,015

UNITED STATES PATENT OFFICE 2,240,015

SOUND DEADENER

Paul G. Peik, Detroit, Mich., assignor to Emulsions Process Corporation, New York, N. Y., a corporation of Delaware No Drawing. Application June 7, 1938, Serial No. 212,397

3 Claims. (Cl. 260—723)

My invention relates to improvements in products primarily adapted for use in insulating automobile bodies, radio cabinets, and the like against the transmission of sound and heat and for dampening out vibrations which produce resonance and sound audible to the ear.

An object of the invention is to produce a rubber compound which is sprayable and especially suitable for the above purposes, or for any purpose where a low cost and easily applied sound dampening material is required.

Previous efforts to employ rubber compositions for sound dampening purposes, so far as I am aware, have been in the main confined to more or less flexible types of rubber. I have discovered that hard rubber, that is, a rubber composition so formulated as to vulcanize to a high degree of hardness, has excellent sound dampening properties.

More especially, the invention has particular relation to the product of a spray-on sound deadening composition containing a type of reclaimed rubber unsuitable for most purposes and now being thrown away in large quantities. There are many sources of reclaimed rubber, such as tires, belting, footwear, hose, rubber mats, tile, etc., but most of the reclaimed rubber is obtained from tires.

I have found that such rubber is ideal for my purpose, as it requires less milling and mixing by far than live rubber in order to become properly mixed with the compounds and solvent. Furthermore, it forms a strong bond on vulcanizing, and, needless to say, a smooth and extremely rugged surface of pleasing appearance. Moreover, the cost is definitely lower than live rubber deadeners, both as to raw material and processing.

To any one familiar with the sound deadening art, it is known that sound deadening efficiency of any material is entirely due to internal friction. I have found that vulcanized rubber of a high degree of hardness possesses this friction factor to a very high degree, especially when a high proportion of a suitable aggregate is added. I have found further that the larger the particle size of the aggregate the greater the internal friction with resultant increased sound deadening efficiency. The particle size of the heavy aggregate is preferably such as to pass through a 20-mesh screen but to be stopped by a 30-mesh screen or to pass through a 25-mesh and stopped by a 35-mesh. A range of 10 is essential to obtain a sufficient recovery of aggregate. In actual practice I prefer to employ ungraded sand as this has advantages from an economical standpoint. The particle size of the aggregate varies, but less so where a screened aggregate is used. Such particles vary in shape and contour but, roughly speaking, approximate the contour of a sphere, cube or elongated rhombolic particles. The friction factor introduced by the aggregate, of course, occurs on the surface of the aggregate, i. e., between the aggregate and the base. In other words, this increased friction is due to the fact that the rigid inflexible particles resist yielding with the somewhat flexible hard rubber. From this it is readily understood why increasing the particle size definitely increases the internal friction factor. Needless to say, the only limitation on particle size is the size of the passages in the spray equipment. As a heavy aggregate, I propose to employ sand, grit, cast iron borings, quartz, iron filings, crushed iron ore, a porous calcined clay known as "Haydite," or any other suitable material having similar characteristics.

Compositions of rubber compounded for the purpose of vulcanizing to an ordinary or high degree of hardness always contain a high degree of reclaimed rubber so lacking in life as to be unsuitable for any other purpose. For that reason cut-backs of these hard rubber compounds are lacking in the viscosity or body of cut-backs of virgin rubber compounds or cut-backs of the better grades of reclaimed rubber. This is true to such an extent that they cannot be mixed with aggregates to produce a sprayable composition which can be sprayed to a suitable thickness on a vertical panel, as is necessary in auto body deadening and the like.

I have found that these objections can be overcome by producing an oil phase emulsion of these cut-backs of low grade rubber with equipment owned and controlled by Gas Fuel Corporation, and preferably by following the methods disclosed in U. S. Patent Nos. 2,059,535 and 2,059,536. In using such apparatus in connection with the present invention, the reclaimed rubber is dissolved in a suitable solvent and is introduced into the mill. A suitable quantity of water is also introduced and also an inert gas, if a gas is to form part of the emulsion. The mill violently beats the substances and acts to cut and pulverize the same, so that an oil phase emulsion of dispersed or dissolved rubber is obtained in which the rubber "solution" is the continuous phase. In so proceeding, it is unnecessary to employ any colloidal element as the emulsions produced by this equipment, when containing appreciable percentages of water, are thick and jelly-like, yet of sleazy and mobile consistency, giving them definite spray characteristics, i. e., the material is readily sprayable and this sprayability is not affected to any serious extent by the addition of a large proportion of aggregates.

While the emulsion without the use of any aggregate results in a fair degree of sound deadening efficiency after the coating has been vulcanized in passing through the ovens (primarily used for the setting of enamel, paint or lacquer applied on the outer surface of the panel), these properties of sound deadening efficiency are greatly increased by the addition of heavy aggregate for reasons already outlined. In simple terms, the action of this type of deadener is the resistance of the hard coating to yielding to the vibrations of the panel. When no aggregate is used, a degree of hardness very close to the limitations of impracticability is necessary. But I have found that a less degree of hardness produces excellent results when the high percentage of aggregate which it is practical to use with the emulsion is introduced.

By way of example, a cut-back containing 40% of low grade reclaimed rubber and 60% commercial rubber solvent, when treated with vulcanizing agents, such as any suitable form of sulphur, to vulcanize to a brittle hardness, has a sound deadening efficiency indicating a rating of from 8 to 10 by the method developed and now used at the University of Michigan. This same cut-back when treated with vulcanizing agents to vulcanize to a hardness which, while very firm and solid, is not brittle, but sufficiently yielding to be highly practical when emulsified with an equal amount of water in the Gas Fuel Corporation equipment heretofore mentioned. Such emulsion when mixed with a heavy aggregate of the kind hereinbefore mentioned and with the aggregate being approximately twice the weight of the entire emulsified base, results after proper vulcanization in an efficiency indicating rating on the scale of 4. Needless to say, a certain degree of plasticity is necessary in materials of this kind as the type of brittle hard material described above would be apt to crack and check in use, resulting in a definite loss in sound deadening efficiency.

One very definite advantage of the hard rubber sprayed-on deadener as compared with a flexible rubber sprayed-on deadener, such as disclosed in my application, Serial No. 212,396, dated June 7, 1938, is that over-vulcanization is not serious. In the case of flexible rubber deadeners, if through mishap or otherwise, the auto body panel or the like should remain in the oven more than 10 or 15% longer than the vulcanizing time for which the composition was compounded, there would be over-vulcanization and loss of flexibility upon which this type of rubber deadener is dependent for efficiency. On the other hand, over-vulcanization of hard rubber compounds does not change their characteristics to any serious extent.

As in the case of all deadener compounds sprayed on vertical panels, a small percentage of a fibrous aggregate of the character of rock wool, asbestos fiber, hair, cotton linters, wood flour, wood fiber, etc., is necessary to keep the composition from creeping before and during curing. Asbestos fiber is admirably adapted for my purpose due to the fact that it is low in cost, inert and available in unlimited quantities. In the example cited above, there would be present by weight approximately 35% emulsified base, approximately 60% heavy aggregate, and approximately 5% fibrous material.

Since the hard rubber coating possesses a high degree of internal friction, commercially practicable results are possible by the use of fibrous material altogether to the exclusion of heavy aggregate. When this fibrous material is used in any appreciable quantity, a harder rubber can be employed in the composition with resultant increase in sound deadening efficiency, since the fiber also acts as a binder preventing cracking. An example of this composition is the oil phase emulsion base, as described above, and made in the equipment of the Gas Fuel Corporation, in a proportion of approximately 70% mixed with approximately 30% all by weight, of fiber.

It is also characteristic of the material compounded as above specified that when subjected to the heat reaction of curing that the elimination of the water causes a sponging action which results in a hard rubber substance containing a large number of cells or a cellular structure.

As indicated in my above-mentioned application with reference to a plastic rubber material, the uniform dispersion of the water throughout the compound also results in a uniform cell structure which gives maximum strength and maximum resiliency with lighter weight. This results in uniform thickness during the setting process and maximum insulation qualities as well as a high degree of heat insulation.

By way of recapitulation, it will be understood that I propose to use a method and apparatus of the kind disclosed in said Gas Fuel Corporation patents to produce an emulsion consisting mainly of reclaimed rubber, a rubber solvent and water. This emulsion is mixed with a heavy aggregate and a light fibrous aggregate before it is sprayed or otherwise applied to the inner surface of a metal panel and passed through a baking oven which is primarily used for the setting of enamel, paint or lacquer applied on the outer surface of the panel. The requisite temperature for effecting this setting (250° F. and upwards) prevails in the oven, and this temperature, in accordance with my invention, results also in the vulcanization of the rubber contained in said mixture.

While my improvements are especially useful in connection with the panels of automobile bodies, radio cabinets and the like, it will be manifest that the invention may be used wherever applicable. I propose, as further examples, to use the same in connection with all types of refrigerators, and to pre-form the mixture into insulating and sound deadening slabs for the ceilings, floor or walls of rooms, such as public buildings, theaters, movie houses, etc.

While I have disclosed my invention in such manner that it may be readily understood by those skilled in the art, I am aware that changes and variations may be made as may be convenient or desirable without departing from the salient features thereof, and I therefore intend the following claims to cover such modifications as naturally fall within the lines of the invention.

What I claim and desire to secure by Letters Patent is:

1. In the manufacture of a sound deadening composition, producing a non-colloidal water-in-oil emulsion of reclaimed rubber having a high per cent of water finely dispersed therein and in which the rubber is the continuous phase, mixing said emulsion with a high percentage of a heavy aggregate approximately twice the weight of the emulsion and consisting of rigid inflexible particles of a particle size to pass through a 20 mesh screen but incapable of passing through a 35 mesh screen, and also mixing with said emulsion a small percentage of a fibrous material sufficient in quantity to prevent the composition from creeping before and during curing.

2. In the manufacture of a sound deadening composition, producing a non-colloidal water-in-oil emulsion of reclaimed rubber having a high per cent of water finely dispersed therein and in which the rubber is the continuous phase, and mixing said emulsion with a heavy aggregate and a fibrous material, the emulsion being present in the composition in approximately 35% by weight, the heavy aggregate in approximately 60% and the fibrous material in approximately 5%, the heavy aggregate consisting of rigid inflexible particles of a particle size to pass through a 20 mesh screen but incapable of passing through a 35 mesh screen.

3. A sprayable sound deadener composition comprising a non-colloidal water-in-oil emulsion of reclaimed rubber having a high per cent of water finely dispersed therein and in which the rubber is the continuous phase, a high percentage of heavy aggregate approximately twice the weight of the emulsion and consisting of rigid inflexible particles of a particle size to pass through a 20 mesh screen but incapable of passing through a 35 mesh screen, and a small percentage of a fibrous material sufficient in quantity to prevent the composition from creeping before and during curing.

PAUL G. PEIK.